July 15, 1952 R. CHILTON 2,603,412
FLUID MOTOR OR COMPRESSOR
Filed Jan. 23, 1947 8 Sheets-Sheet 1

INVENTOR
ROLAND CHILTON.
BY
ATTORNEY

July 15, 1952 R. CHILTON 2,603,412
FLUID MOTOR OR COMPRESSOR
Filed Jan. 23, 1947 8 Sheets-Sheet 3

INVENTOR
ROLAND CHILTON.
BY
ATTORNEY

July 15, 1952     R. CHILTON     2,603,412
FLUID MOTOR OR COMPRESSOR
Filed Jan. 23, 1947     8 Sheets-Sheet 4
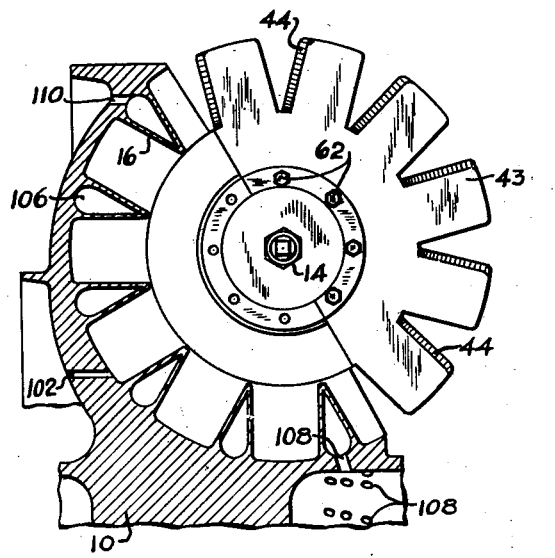
Fig. 5
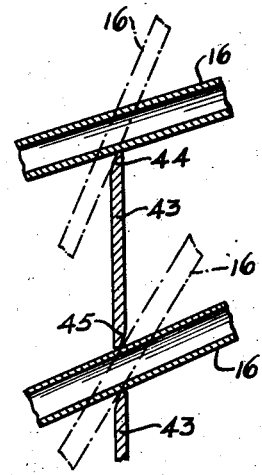
Fig. 4
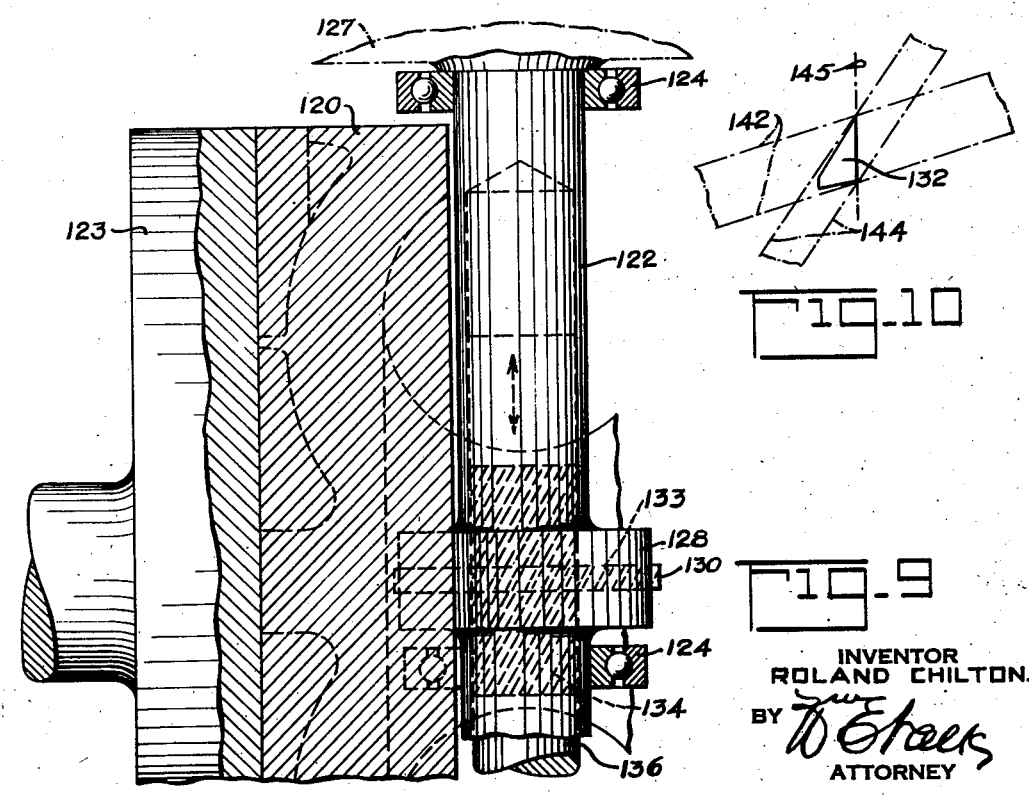
Fig. 10
Fig. 9
INVENTOR
ROLAND CHILTON.
BY
ATTORNEY July 15, 1952 R. CHILTON 2,603,412
FLUID MOTOR OR COMPRESSOR
Filed Jan. 23, 1947 8 Sheets-Sheet 5

INVENTOR
ROLAND CHILTON
BY
ATTORNEY

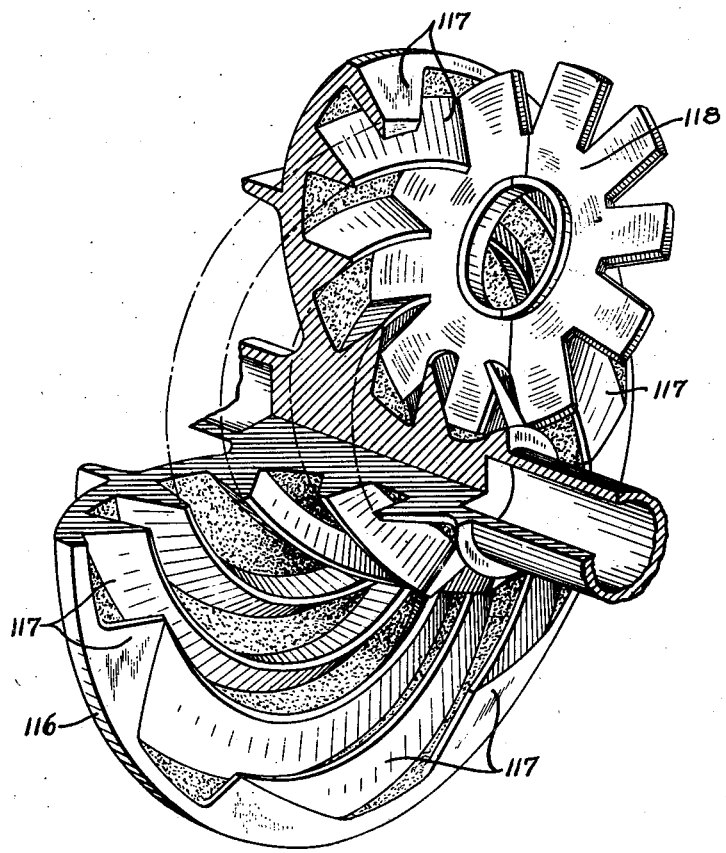

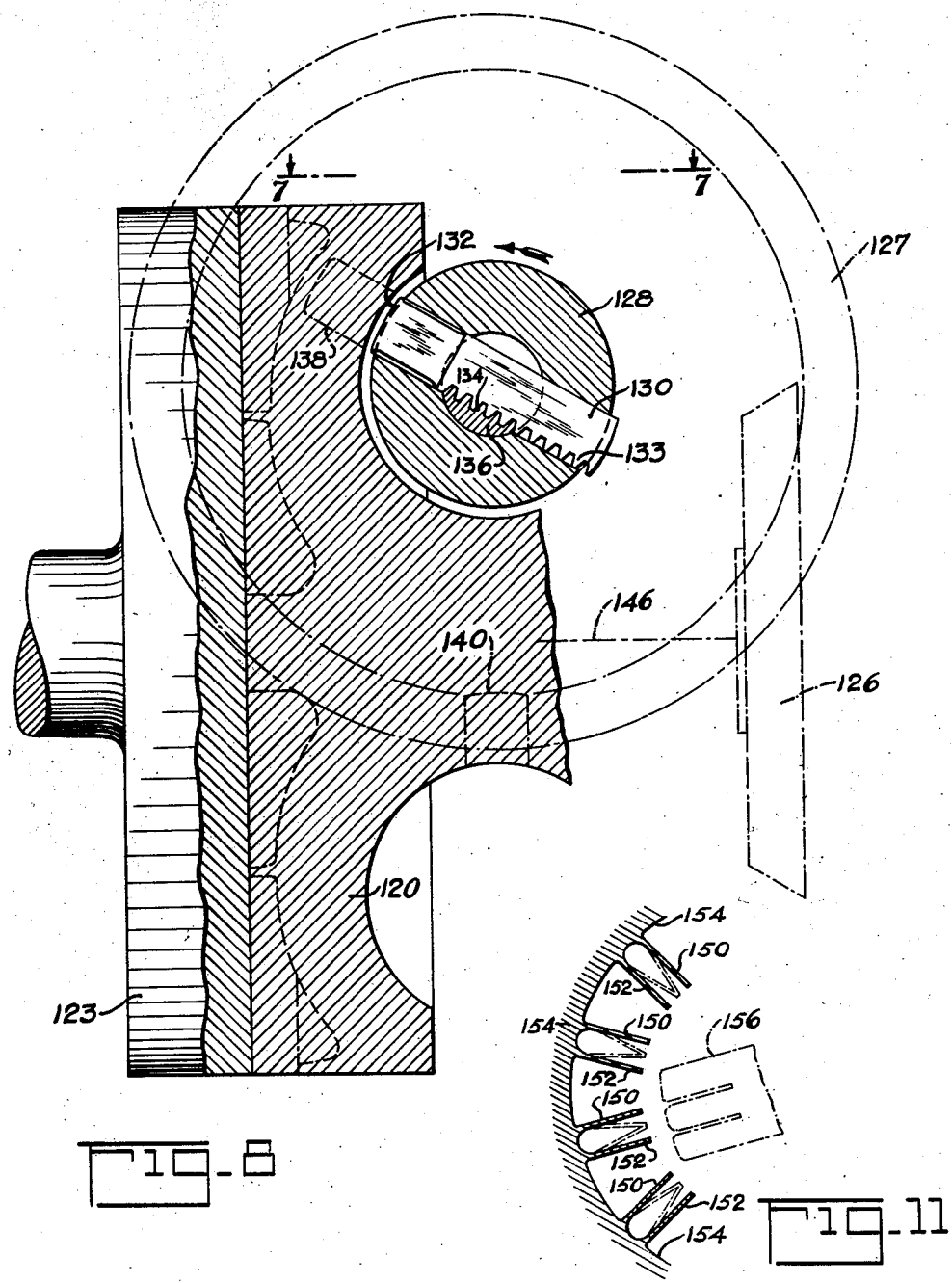

July 15, 1952  R. CHILTON  2,603,412
FLUID MOTOR OR COMPRESSOR

Filed Jan. 23, 1947  8 Sheets-Sheet 8

INVENTOR
ROLAND CHILTON.
BY
ATTORNEY

Patented July 15, 1952

2,603,412

UNITED STATES PATENT OFFICE 2,603,412

FLUID MOTOR OR COMPRESSOR

Roland Chilton, Glen Rock, N. J., assignor to Curtiss-Wright Corporation, a corporation of Delaware Application January 23, 1947, Serial No. 723,738

16 Claims. (Cl. 230—150)

1

The invention relates to rotary machines for compressing fluid within the machine to a desired pressure or for converting the pressure energy in a fluid into mechanical energy by expanding the fluid within the machine.

A prime object of the invention comprises the provision of a novel machine suitable for very high rotational and peripheral speeds in order to obtain a high capacity, in relation to the weight and bulk of the machine, as is a prime requirement in connection with gas turbine power plants for aircraft, for example, where much larger volumes of air must be compressed and expanded than in conventional reciprocating power plants of equivalent horsepower. Because of its small size in relation to its capacity, it is proposed to use a machine of the type herein disclosed as, for instance, a starter for large aircraft power plants, such as gas turbines.

A further object of the invention comprises the provision of a novel machine wherein air or other fluid is compressed or expanded without change in speed of flow and with only small and smooth changes in direction. This latter feature is quite important in gas turbine power plants since the overall efficiency of such power plants is critically dependent on the efficiency of the compressor and expansion units used.

A still further object of the invention comprises the provision of a novel positive displacement machine wherein air or other fluid is compressed (or expanded) to the desired pressure before it discharges from the machine, which pressure, in the case of compressors, is called the receiver pressure. In contrast, in positive displacement machines like the conventional Roots-type blower, there is no compression within the machine since the rotors of the blower cooperate with ports which open up an entrained volume of air or other fluid at atmospheric or inlet pressure to the high pressure receiver. The result is that the high pressure receiver air surges back into the entrained volume of low pressure air or other fluid until the receiver pressure is reached, whereupon the rotors of the Roots blower re-expel the surge-back air. This cyclic surging causes the noisy operation and low efficiency characteristic of Roots-type blowers at high pressures. This invention provides a novel machine wherein the air or other fluid is compressed or expanded to the outlet pressure before communication with the outlet pressure is established, and the compressed fluid leaves the machine at constant pressure and uniform velocity. Such positive displacement machines have a relatively flat

2 efficiency curve—that is, they operate at or near substantially maximum efficiency over a relatively wide range of operating conditions as compared to kinetic type machines in which operation depends on changes in the direction and/or magnitude of the fluid velocity.

In the prior art, compression within a machine has been achieved with screw-type compressors by means of timed ports in the housing uncovered by helical rotor lobes when the receiver pressure has been reached. This prior art structure generally involves interrupted flow, wire drawing at the compressor opening and cut-off ports as well as a relatively tortuous fluid path through the compressor, all of which detract from the efficiency, especially at the high speeds herein contemplated. Accordingly, a further object of the invention comprises the provision of a novel machine providing constant gross intake area and delivering the fluid through a constant gross delivery area uninterrupted as by valves or ported cut-off means in the housing structure. Another object of the invention comprises the provision of a novel machine having substantially axial fluid entrance and exit passages without sudden changes in direction of the fluid flow.

Rotary machines of the types discussed when run dry (un-lubricated) are subject to leakage losses because the cooperating rotors must have a small operating clearance to avoid the wear which would result if the high velocity rotors were permitted to rub when working on a dry fluid. For this reason, in screw type compressors and Roots blowers, the rotors are connected by external gearing maintaining them in the proper timed relation to preserve the necessary small working clearance between the cooperating rotor elements and such gearing may be used in the present invention. The leakage loss through the necessary clearances between the rotor vanes is proportional to the pressure drop between the adjacent pressure compartments. In many of the machines of the prior art, in which the fluid is compressed within the machine, the entire pressure rise through the machine exists between adjacent inlet and compression compartments separated by a single sealing zone. A further object of the present invention is to distribute the pressure rise or drop over a relatively large number of compartments so that the pressure difference across any one of the sealing zones which separate adjacent compartments is relatively small. In the case where the entire pressure difference across the machine is present across a single seal zone (between adjacent inlet and outlet pressure spaces), a 10% leakage loss, for example, represents a 10% loss in volumetric efficiency and requires that the leakage air be re-compressed through the entire compression ratio, involving a corresponding power loss. Supposing now that the machine, for example, has $n$ sealing zones in series between the inlet and outlet, the pressure drop across any zone will be only $1/n$th the previous amount and, moreover, the reduced volume of leakage air will be re-compressed or expanded through a correspondingly smaller pressure change.

According to the present invention, a machine having a plurality of such sealing zones between its inlet and outlet ends is obtained by a novel arrangement comprising a main rotor having a plurality of spiral-like vanes projecting from a toric surface on said rotor and extending at least part way about the rotor axis. With this arrangement, the spaces between adjacent vanes have a spiral-like form and extend from the outer periphery of the rotor to its hub. These spiral-like vane spaces comprise fluid passages which are divided into segments sealed from the adjacent segments by partitions comprising teeth of radially disposed discs mounted for rotation about fixed axes transverse to the axis of said rotor. The partition discs are circumferentially spaced about the main rotor axis and, since they are radially disposed relative to the rotor, the circumferential distance between adjacent partition discs decreases from the circumference of the main rotor to its hub. As illustrated in the drawings, the ratio to the center of a sealed segmental vane space at the periphery of the rotor to the corresponding radius at the hub of the rotor is about 4:1 so that the circumferential length of the segmental spaces between two adjacent partition discs is one-fourth as long at the hub of the rotor than at its periphery, thereby providing—in the case of a compressor—a 4:1 volumetric compression ratio or about a 6:1 compression pressure ratio with adiabatic compression. A prime object of the invention is to provide a machine which will have high displacement capacity per revolution in combination with high compression ratio (or expansion ratio in the case of a motor).

The invention is not limited to use with the aforementioned partition discs because the rotor, with the spiral-like passages, will produce kinetic compression of the fluid therein when driven at high speeds or the machine may be operated as a radial flow turbine.

When the machine is provided with the aforementioned partition discs, the rotor toric surfaces must be generated by a circular arc, spaced from the rotor axis, as the arc is rotated about the rotor axis. In addition, the partition discs must be mounted for rotation about axes tangent to the pitch circle of this toric surface. As herein used, the "pitch" circle of a toric surface, generated by a circular arc, is the circle followed by the center of this arc during said generation. In order to permit rotation of the main rotor and partition discs, at a predetermined fixed speed ratio (12:8 in the structure illustrated), the spiral-like vanes must be of such form that as a point moves along a vane—for example, along its apex or tip—the ratio of the angle of rotation of the point about the rotor axis to its angle of rotation about said pitch circle is constant. Vanes of this specific form are herein termed helico-spiral vanes. The term helico-spiral has been adopted because adjacent the outer periphery of the rotor where the toric surface is substantially disc-like, the form of each vane approximates an Archimedes spiral while adjacent the hub of said rotor where said toric surface is substantially cylindrical, the form of each vane approximates a true helix. Between the helical and Archimedes spiral portions, the vanes merge smoothly.

Other objects of the invention will become apparent upon reading the annexed detailed description in connection with the drawing in which:

Figure 4 is an enlarged sectional view through a partition disc tooth;

Figure 5 is a schematic view illustrating a step in the method of assembling the partition discs with the main rotor;

Figure 7 is a perspective view partly in section of a modified form of the invention;

Figure 8 is a schematic view of apparatus for machining the main rotor;

Figure 9 is a view taken along line 7—7 of Figure 8;

Figure 10 is an end view of the cutter used in Figures 8 and 9;

Figure 11 is a sectional view illustrating a step in the fabrication of hollow rotor vanes.

Figure 1:
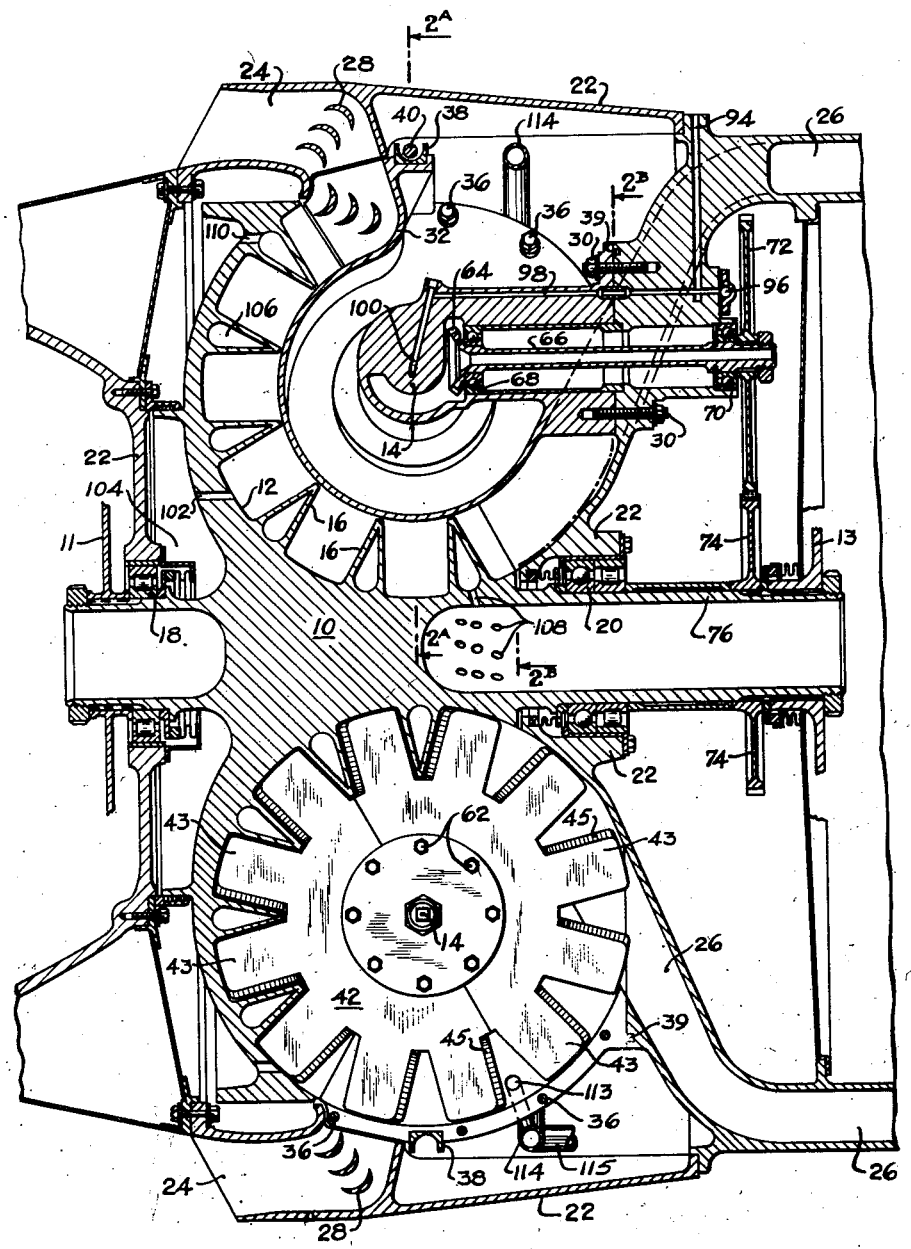
Figure 1 is an axial sectional view taken along line 1—1 of Figure 3 illustrating a preferred embodiment of the invention.

For convenience of discussion, a machine embodying the invention will be described in terms of compressor operation but, as will be obvious, the machine may be used as a fluid motor in which fluid under pressure is supplied to the hub of the rotor and flows expansively and radially outwardly to the rim of the rotor.

Figures 1–5 illustrate a volumetric type compressor or pressure type expansion motor as distinct from the kinetic type since the partition discs prevent rotation of the fluid about the rotor axis. However, as described in connection with Figure 12, a machine, without the partition discs, will produce kinetic compression at high speeds or function as a radial flow turbine.

Referring now to the drawing, the modification illustrated in Figures 1–5 comprises a main rotor 10 arranged to be driven from either end as, for example, from a member 11 or 13 splined thereto. The rotor 10 is provided with a toric surface 12 generated by a circular arc, spaced from the rotor axis, as the arc is rotated about this axis. As illustrated, the generating circular arc sub-tends an angle of slightly less than 180° about its center or toric pitch circle (previously defined), indicated at 14 in Figure 1. Integrally formed with the rotor 10, as hereinafter described, are a plurality of spaced spiral-like vanes 16 projecting from said toric surface, preferably at right angles thereto as illustrated. The outer edges or apices of the vanes 16 define a toric surface having the same pitch circle as said rotor toric surface 12. In Figures 1–5 the vanes 16 have the previously described helico-spiral form. Eight vanes 16 have been illustrated and each vane sub-tends an angle of about 270° about the axis of the rotor and an angle of slightly less than 180° about the pitch circle 14. However, the number of the vanes and their angular extent about the rotor axis and pitch circle may be varied without departure from the scope of the invention. The fluid to be compressed is received between the vanes so that, for reasons of capacity, the maximum width of the vanes is made considerably less than the width of the inter-vane spaces, in fact the vane width is reduced to the minimum value providing adequate vane strength.

The rotor 10 is supported by bearings 18 and 20 carried by a multi-part main housing structure 22. The housing structure 22 is formed to provide an annular fluid inlet duct 24 communicating with the outer periphery of the spiral-like spaces between the vanes 16 and to provide an annular fluid outlet duct 26 communicating with said spiral-like spaces at the hub of the rotor. Suitable annular guide vanes 28 are preferably provided at the annular inlet to help turn the fluid to be compressed in an inward direction into the spaces between the vanes 16.

Rigidly secured to the main housing structure 22 by screws 30 are housing segments 32 and 34 secured together by bolts 36 and an encircling clamping band 38. Preferably, the band 38 comprises two halves drawn together by bolts 40. In addition, for accurate location, each housing segment is provided with a machined pilot 39 arranged to be received within a groove in the main housing structure 22. The inner surface of the housing segments 32 and 34 extend across the outer edges of the vanes 16 in slight clearance relation thereto to enclose the spiral-like spaces between the vanes. Accordingly, the inner surfaces provided by the housing segments 32 and 34 is a toric surface having the same pitch circle 14 as the toric surface 12. The segments 32 and 34 are alternately disposed about the rotor axis and their walls 33 and 35 are formed to provide slots 41 therebetween through which circumferentially spaced partition discs 42 extend.

Figure 6:
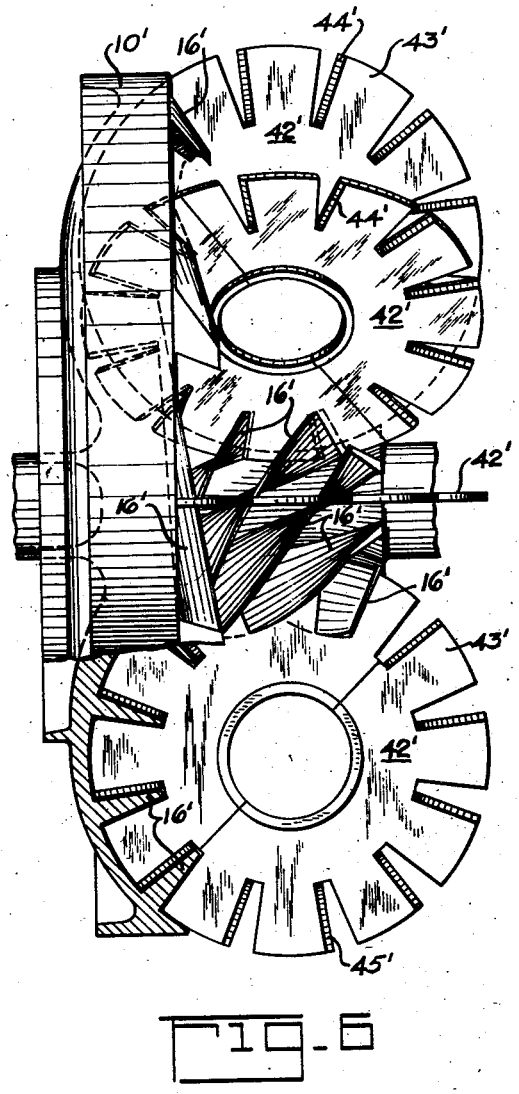
Figure 6 is a side elevational view partly in section of the main rotor with a modified rotor vane and partition tooth construction and with several partition discs schematically positioned thereon.

Each partition disc 42 is radially disposed—that is, it lies in a plane including the axis of the rotor 10—and each disc 42 is mounted for rotation about a fixed axis tangent to said pitch circle 14. In addition, the partition discs are provided with teeth or lobes 43 adapted to be received in the spaces between the vanes 16 for motion relative thereto. The meshing engagement of the vanes 16 with the partition disc teeth 43 is best illustrated in Figures 1 and 6. To permit relative rotation of the rotor 10 with the meshing disc teeth 43, it is essential that the radial cross-section of each inter-vane space must be constant throughout its length, as indicated in Figure 1. As previously mentioned, the vanes 16 have a helico-spiral configuration—that is, for any increment along a vane, the ratio of its angular advance about the axis of the main rotor 10 to its angular advance about the toric pitch circle is constant. However, because the angle each vane 16 makes with a partition disc 42 progressively increases from the outer periphery of the rotor 10 to its minimum diameter portion, the thickness of each vane is made to progressively change in order that both its width and the cross-section of each inter-vane space, are the same in any radial plane, whereby the partition disc teeth 43 and vanes 16 may mesh and rotate relative to each other as gear teeth of a "Hindley" worm and worm wheel hereinafter referred to. This change in inclination and thickness of each vane 16 is best illustrated in Figure 4. Figure 4 comprises an enlarged sectional view through a partition disc tooth 43 in mesh with a pair of vanes 16 adjacent the periphery of the rotor 10 and in dotted lines there is superimposed a section of a pair of vanes 16 adjacent the hub of the rotor 10. In addition, in order to permit rotation of the vanes 16 simultaneously with and relative to the meshing partition discs 42, the partition disc teeth 43 are chamfered on opposite sides of their central planes as illustrated at 44 and 45 in Figure 4, to avoid interference with the vanes as the partition discs and vanes rotate.

The aforedescribed arrangement or form of the vanes 16 and partition discs 42 is an expansion of the principle of the "Hindley" type of enveloping worm and wheel, also known as the "throated" or "hour-glass" worm. As used in worm gears, these enveloping worms have been limited in length because of assembly difficulty. In the Hindley worm, when the angle of embracement of the worm exceeds the slope of the sides of its teeth, an interference or under-cutting effect prevents cutting the worm teeth by the usual methods and, in addition, the worm and worm wheel can not be assembled by moving the worm wheel teeth radially into the worm. In addition, such enveloping worms in the prior art have been symmetrical—that is, they sub-tend an equal and relatively short angle of embracement (of the order of 15°) on each side of the minimum diameter portion of the worm. In the present invention, the enveloping angle of the vanes is asymmetrical and is much greater than said prior art structures. As illustrated, the vanes 16 have a small angle of embracement to the right (Figure 1) of the minimum diameter point of the main rotor 10 and, on the left side of this point, the vanes extend to the outer periphery of said rotor so that the total angle of embracement of the vanes is only slightly less than 180°. With this large angle of embracement, it is obviously impossible to assemble the rotor 10 and partition discs 42 by merely moving the disc teeth radially into the rotor vanes. Their method of assembly is hereinafter described.

Enveloping worms and worm wheels have a special, though not widely recognized, property in that their teeth do not roll on each other and, therefore, need not be conjugate forms—such as, for example, an involute worm wheel tooth adapted for rolling against a straight sided rack tooth. In fact, the tooth section of enveloping worms may be arbitrarily chosen since there is no rolling action between their teeth. It is convenient to make the partition disc teeth 43 and the cooperating inter-vane spaces parallel sided since, with this construction each vane 16 tapers outwardly to its apex or outer edge, thereby providing each vane with a substantial thickness at its root portion, as is needed to resist bending of the vanes under the centrifugal forces acting thereon during rotor rotation. Also, this construction facilitates cutting of the vanes from a rotor blank as hereinafter described. However, in order to increase the capacity of the machine, it may be desirable to make the root portions of the inter-vane spaces somewhat wider than their width at the apex of the vanes, for example as illustrated in Figure 6. In addition, in Figure 6, the vanes of the main rotor have been made solid instead of hollow. The structure of Figure 6 is otherwise similar to that of Figures 1–5 and like parts have been indicated by like but primed reference numerals.

It should now be apparent that, because of the cooperation of the vanes 16 and disc teeth 43, rotation of the main rotor 10 would enforce rotation of the partition discs 42, the rotor vanes 16 and partition disc teeth 43 cooperating in a manner similar to the teeth of an enveloping worm and worm wheel combination. With the form of the vanes illustrated, each twelve revolutions of the rotor 10 would enforce eight revolutions of each partition disc 42. However, with the machine operating "dry" as an air compressor, at the high speeds of rotation contemplated by applicant, the rubbing friction between the vanes 16 and partition disc teeth 43, when operating as gears, may be excessive. Accordingly, gearing connections between the rotor 10 and discs 42 have been provided, as hereinafter described, to insure their rotation at the proper predetermined timed relation so that the vanes 16 and meshing disc teeth 43 always have a small clearance around the teeth 43. This clearance has been greatly exaggerated in Figure 1 to admit of illustration. Obviously, this clearance should be kept as small as possible to reduce leakage loss in the machine. If the machine fluid is clean, i. e. the fluid is free from grit or other foreign matter as, for example, steam, then said gearing between the main rotor and the partition discs probably could be dispensed with, particularly in the smaller size machines and/or if lubrication of the vanes is resorted to.

Figure 2:
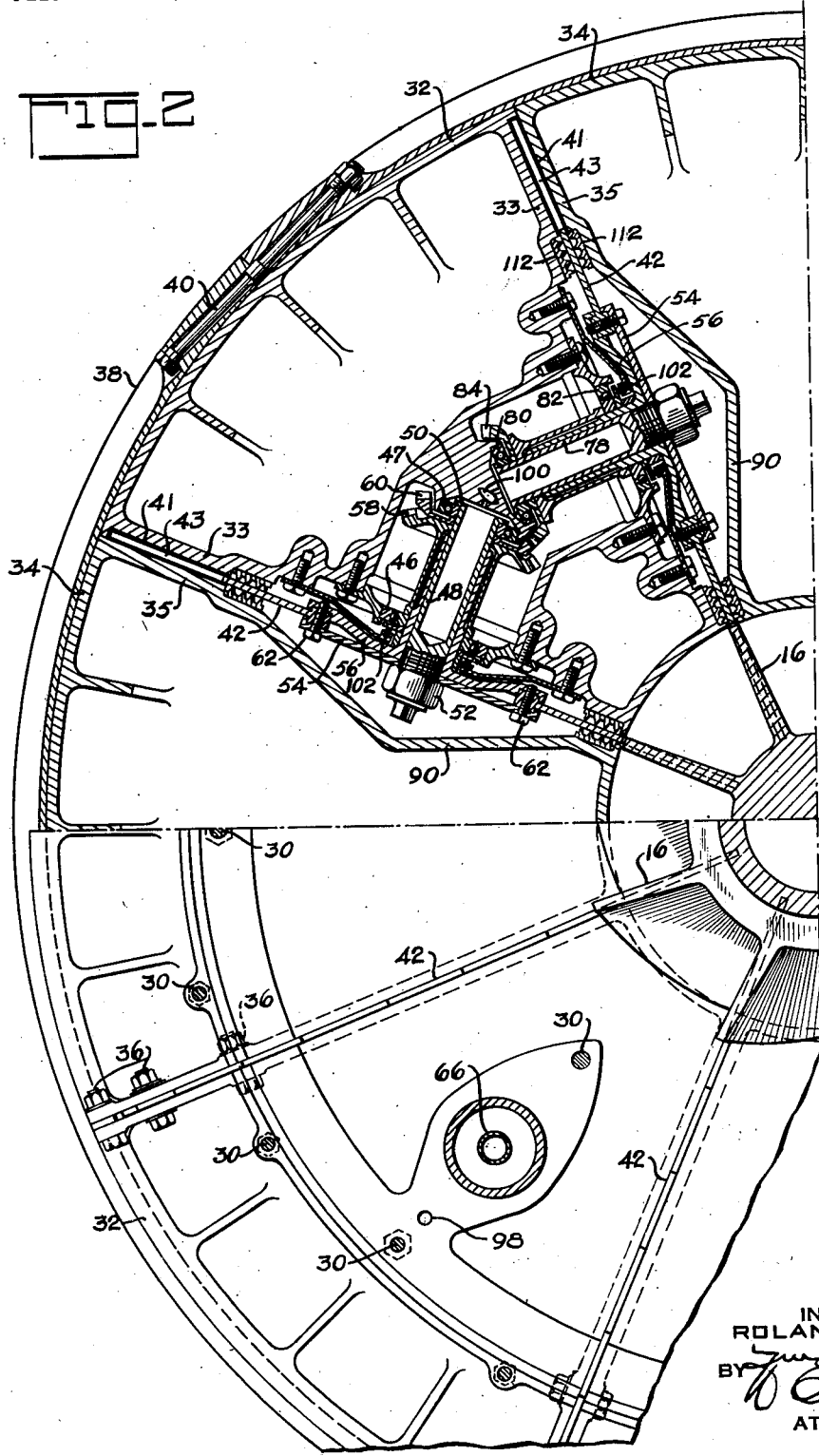
Figure 2 is an enlarged view partly in section and partly in elevation in which the upper and sectional part is taken along line 2A—2A of Figure 1 and the lower part in elevation is taken along line 2B—2B of Figure 1.

As best seen in Figure 2, the partition discs 42 are all journaled in the housing segments 32 with the housing segments 34 filling in the spaces therebetween. Each housing segment 32 is provided with means for supporting the pair of adjacent partition discs 42 for rotation on axes tangent to said toric pitch circle 14. To this end, bearings 46 and 47 are carried by each housing segment 32 within which a shaft 48 is journaled so that its axis is tangent to the aforementioned toric pitch circle. The shaft 48 is provided with an end flange 50 and a nut 52 threaded on its other end serves to clamp hub members 54 and 56 and bevel gears 58 and 60 therebetween so that these parts are rotatable as a rigid structure. Each partition disc 42 is formed in two halves for reasons of assembly and the halves are additionally secured together between the hub members 54 and 56 by screws 62. Each bevel gear 58 meshes with a bevel gear 64 formed integral with a shaft 66 having a bearing 68 in a housing segment 32 and a bearing 70 in the main housing structure 22. Gears 72, rigidly secured to the outer ends of the shafts 70, are disposed in meshing engagement with a gear 74 splined to the shaft-like extension 76 of the main rotor 10.

The other partition disc 42 carried by each housing segment 32 also comprises two halves which are rigidly connected to similar hub members 54 and 56 clamped to a shaft 78. Each shaft 78, like each shaft 48, is journaled in bearings 80 and 82 in a housing segment 32 so that its axis of rotation is fixed and is tangent to said toric pitch circle 14. Only one bevel gear 84 is secured to each shaft 78 and this gear meshes with the gear 60 on the adjacent shaft 48 to provide a 1:1 drive ratio therebetween.

With this construction, the partition discs 42 are interconnected by bevel gears 60 and 84 so that the discs all rotate at the same speed and in the same direction when viewed in a given direction along the pitch circle 14. In addition, the gears 72 and 74 and bevel gears 58 and 64 provide the correct predetermined speed ratio (12:8) between the main rotor 10 and the partition discs 42 to prevent frictional contact between the vanes 16 and the disc teeth 43 during rotation of the rotor 10 and the discs 42.

Assembly of the partition discs 42 in meshing engagement with the rotor vanes 16 may be effected as follows. The partition disc shafts 48 and 78, together with their bevel gears 58, 60 and 84 and the hub member 56, are first assembled in their housing segments 32 and then these segments are disposed in position relative to the rotor 10. A suitable fixture may be used for holding the segments 32 in their proper positions. Then, before the alternate housing segments 34 are placed in position, half of a partition disc 42 is secured to a hub member 56 by screws 62 while the half-disc is out of contact with the rotor vanes 16 (as illustrated in Figure 5)—that is, with the half-disc in the 180° arc opposite to that sub-tended by the rotor vanes 16 about the pitch circle 14. Then, by manual rotation of the half-disc and the main rotor 10 in properly timed relation, the disc teeth 43 of this half may be engaged between the vane spaces. This rotation is continued until the half-disc 42 is completely wound into mesh with the vanes 16 whereupon the complementary half-disc may be assembled free of the rotor vanes 16, both halves of the disc now being secured to both hub members 54 and 56 to complete the assembly of a disc 42 to a shaft 48 or 78. This operation is repeated until all the discs 42 have been mounted in position.

Easy access to the hub members 54 and 56 and the shafts 48 and 78 is made possible because the alternate housing segments 34 are not placed in position until after the partition discs 42 have been completely assembled in position on the housing segments 32. The housing segments 34 are then inserted radially relative to the rotor axis to fill up the spaces between the housing segments 32 except for the slots 41 therebetween through which the partition discs 42 extend. Each segment 34 has a conical depression 90 in its side walls over the projecting ends of the adjacent shafts 48 and 78. The design of the housing segments 34 is such that their radial inner portions have a circumferential width sufficiently small to clear the space between the projecting ends of the shafts 48 and 78 as these housing segments are inserted into position radially relative to the axis of the rotor 10.

With the aforedescribed construction, upon rotation of the main rotor 10 and partition discs 42, the fluid supplied through the annular inlet duct 24 enters the spiral-like spaces between the vanes 16. These spaces are divided into segments by the teeth 43 of the radially disposed partition discs 42 and, as best seen in Figure 3, because of the radial disposition of the partition discs relative to the axis of the rotor 10, the circumferential length of each such segmental vane space progressively decreases from the outer periphery of the rotor 10 to its minimum diameter portion.

Figure 3:
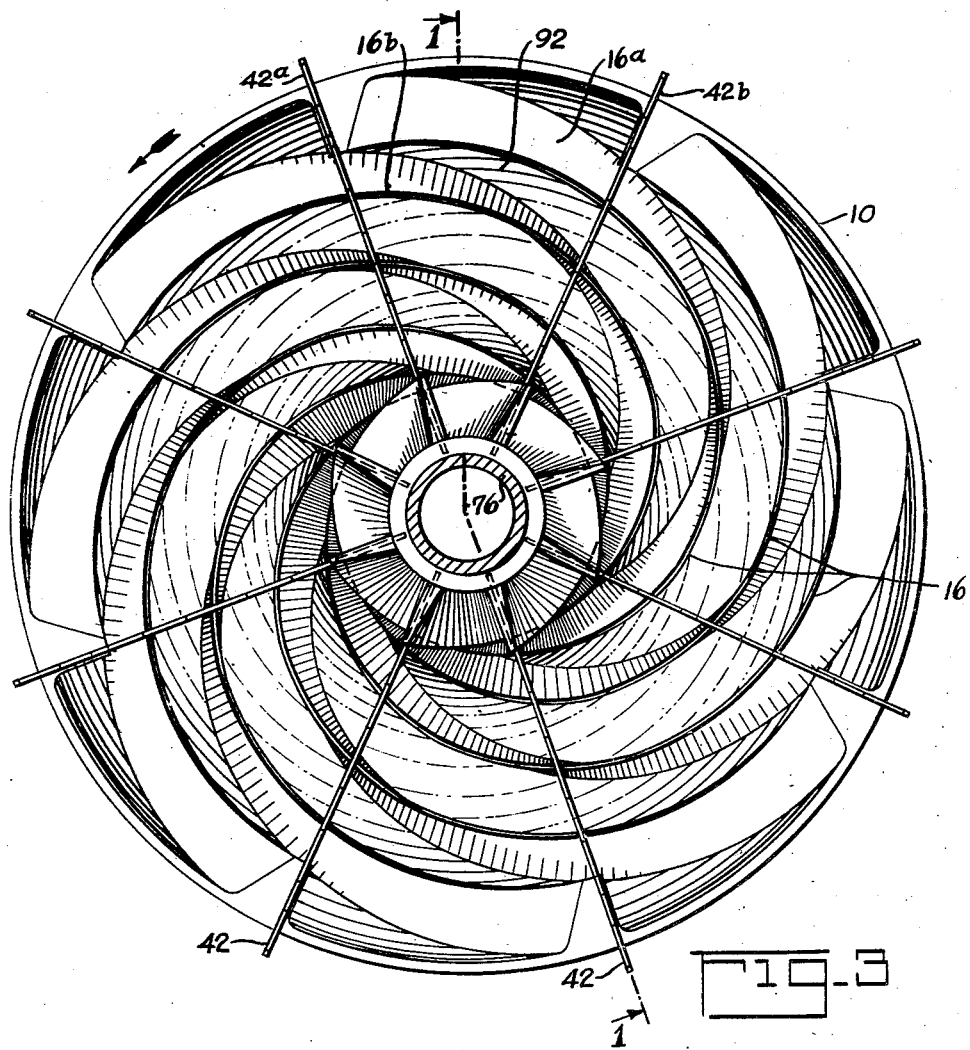
Figure 3 is an end view of the main rotor with the partition discs schematically superimposed thereon.

The operation of the machine may best be understood by referring to Figure 3. As there illustrated, the rotor 10 rotates in a counterclockwise direction and, as viewed from the left of Figure 3, the two partition discs 42, designated 42a and 42b, rotate counterclockwise and a tooth of the partition disc 42a has just entered between a particular pair of vanes 16, designated 16a and 16b, thereby trapping the fluid in a segmental inter-vane space 92. As the rotor and partition discs continue to rotate, the segmental space 92 moves inwardly between the radial partition discs 42a and 42b. Accordingly, the segmental space 92 gets smaller and smaller in circumferential length thereby compressing the fluid trapped therein until the tooth 43 of the partition disc 42b, sealing the right end of this space, runs out from between the vanes 16a and 16b thereby opening the segmental space to the outlet duct 26. Thus, fluid is continually being trapped and compressed in a vane space between each adjacent pair of partition discs and the compressed fluid is continually being discharged into the annular outlet duct 26. The ratio of the radius of the rotor 10 at the periphery of the vanes 16 to its hub radius has been illustrated as approximately 4:1 whereby the circumferential length of each segmental intervane space is only one-fourth as long at the hub of the rotor 10 as at its periphery thereby providing a 4:1 volumetric compression ratio within the machine.

With this construction, it is not necessary to arrange fluid inlet and outlet ports in the fixed housing structure in timed relation to the rotor to provide for compression of the fluid within the machine. Thus, with the present invention, the entire discharge end of the annular inlet duct and the entire annular entrance to the outlet duct are continually open to the spaces between the vanes 16. Therefore, the gross intake area and the gross delivery area of the machine are constant.

In Figure 3, the peripheral ends of the vanes 16 appear to be too wide to pass between the partition disc teeth 43. Actually, this is not the true width of the vanes, because the vanes approach the outer periphery of the rotor 10 at a small angle and the ends of the vanes are chamfered to conform to the outer periphery of the rotor, thereby providing the vanes with a sharp leading edge in the case of compressor operation.

As stated, a prime object of the invention is to provide a machine with a high compression ratio and a high capacity per revolution of the main rotor. In the machine described, compression starts only after a segmental vane space such as 92 has been closed to the inlet duct by the peripheral or outer end of a vane 16 being received between the teeth of an adjacent partition disc 42 and the compression only continues until said segmental space is opened to the outlet duct by the inner or hub end of a vane leaving a partition disc. Accordingly, the compression ratio is approximately equal to the ratio of the radius from the rotor axis to the center of volume of a segmental vane space at the instant of its closure to the inlet duct to the radius of the center of volume of a segmental vane space at the instant of its opening to the outlet duct. Therefore, it should be apparent that for a given size rotor the compression ratio increases with increase in the number of closed segmental vane spaces disposed between adjacent partition discs and with decrease in the maximum circumferential length of said spaces between adjacent partition discs, so that the compression ratio will increase with increase in the number of partition discs, with increase in the number of vanes and/or with increase in the angle subtended by each vane about the rotor axis between the periphery and minimum diameter portions of the rotor.

The machine illustrated in Figures 1-5 has eight vanes 16 and eight partition discs 42 providing a volumetric compression ratio within the machine of approximately 4:1. Incidently, with eight vanes 16 at least five teeth of each partition disc 42 are completely in mesh between vanes 16 (thereby providing at least five closed inter-vane spaces 92 between each pair of partition discs 42), and this fact, together with the large angle of embracement of the vanes with each partition disc, makes it impossible to assemble them by moving the partition disc teeth radially into the rotor vanes. As previously described, this assembly difficulty has been overcome by making each partition disc in two halves and separately winding each half into mesh with the vanes 16. In a machine similar to that of Figures 1-5, if the number of vanes is reduced from eight to seven and the number of partition discs is reduced from eight to six, the compression ratio would be reduced to approximately 3½:1. This loss in compression ratio is greatly accelerated as the number of vanes and partition discs are further reduced. In fact, with a very small number of vanes and/or partition discs it is necessary to greatly increase the angle subtended by each vane in order to obtain any compression ratio within the machine. Also, in a machine similar to that illustrated in Figures 1-5, increasing the number of vanes and/or partition discs beyond eight and eight respectively results in only a small increase in the compression ratio which, with infinitely thin partition discs, approaches a theoretical maximum value equal to the ratio of the peripheral radius of the rotor to its minimum hub radius. Also, it should be noted that, although a plurality of vanes and partition discs are necessary for a high compression ratio, the capacity of the machine is decreased by the volume of the vanes and the volume of the partition disc teeth in mesh with the vanes. Accordingly, it is desirable to make the partition discs as thin as practical and to make the vanes as narrow in width, relative to the width of the inter-vane spaces, as vane strength considerations permit. In addition, wide vanes and thick partition discs both result in a space of relatively large volume between adjacent partition disc teeth, thereby increasing pumping-back losses, that is, increasing the quantity of compressed fluid carried back to the compressor inlet through these spaces as hereinafter described. At this point it may be noted that the machine compression ratio may be increased at the expense of machine capacity by increasing the thickness of the partition discs since this results in a proportionately greater percentage decrease in the volume of the segmental vane spaces adjacent the hub of the rotor as compared to the percentage decrease in volume of these spaces adjacent the periphery of the rotor.

Each vane 16 subtends an angle of approximately 270° about the rotor axes between the periphery of the rotor and its minimum diameter portion. As mentioned, by increasing this angle it is possible to increase the compression ratio. However, each particle of fluid passes through the machine during rotation of the rotor through an angle approximately equal to the angle subtended by each vane about the rotor axes. Accordingly, it is desirable to make this angle as small as is consistent with the compression ratio desired within the machine in order to make the capacity of the machine as large as possible.

Because of the helico-spiral form of the vanes 16, the rate at which the intersection of a vane with a fixed radial plane moves about the toric pitch circle 14 is proportional to the speed of rotation of the rotor 10. For this reason and because the partition discs 42 are positioned in fixed radial planes, the speed of flow of the fluid being compressed remains unchanged as it passes through and is compressed within the vane spaces when the rotor 10 has a uniform speed. Accordingly, it is inherent in the machine that, regardless of the speed of rotation of its rotor 10, the fluid enters the spaces between the vanes at a direction relative thereto tangent to the peripheral edge of the vanes. That is, the fluid enters between the vanes at a zero angle of attack to the vanes so that no work is done on the fluid until it is enclosed in a segmental vane space by the partition disc teeth. Similarly, at the outlet end of the machine, it is inherent that the compressed fluid leaves the vanes at a direction relative thereto which is tangent to the discharge end of the vanes. This feature is quite important because it permits the machine to operate with relatively high entrance and discharge fluid velocities as compared to conventional vaned compressors in which the air enters the vanes with a finite angle of attack or at best the angle of attack is substantially zero at only one speed of the rotor.

Another advantage inherent in the machine of the present invention arises from the radial disposition of the partition discs 42 and that these discs rotate about fixed axes. Accordingly, rotation of the fluid about the axis of the rotor 10 is prevented, except for any incidental eddying or turbulent flow within the segmental vane spaces, so that the flow path of each particle of fluid lies in a radial plane relative to the axis of the main rotor. Thus, a segment of fluid flowing into a space between a pair of adjacent vanes 16, in the plane of Figure 1, remains in this plane as it is compressed through the rotor 10 to the outlet duct 26 so that the fluid flow path of each particle is quite smooth and contains very few bends.

Lubricating oil for the bearings and gears, providing a driving means for the partition discs 42, is supplied through a passage 94 communicating with an annular duct 96. Each housing segment 32 is provided with a passage 98 communicating with the annular duct 96 for supplying lubricating oil to a chamber 100 from which it is supplied to the various bearing surfaces and gears. Suitable drain passages (not shown) provide for return flow of the lubricating oil through the housing structure. Seals, such as indicated at 102, prevent leakage of the lubricating oil to the partition discs 42.

The pressure of the working fluid within the machine between the vanes 16 results in an axial thrust on the rotor 10 to the left (Figure 1). To at least partially balance this thrust, fluid under pressure is supplied through an opening or openings 102 in the rotor to a sealed annular chamber 104 between the rotor and the fixed housing structure 22. With this arrangement, the working fluid of the machine supplies the fluid pressure for at least partially balancing the axial thrust on the rotor 10. Two rotors secured together back to back, as is conventional in centrifugal compressors, may be used in a single machine thereby eliminating the necessity for providing means to absorb or balance any axial thrust. In addition, two rotors thus secured back to back provide a symmetrical arrangement which eliminates any tendency of the body of the rotor to bend under the action of centrifugal force.

The vanes 16 may be solid but, for strength, they are preferably made hollow, as indicated at 106, with the ends of each vane suitably closed. By making the vanes hollow, the mass of each vane is materially reduced thereby reducing the centrifugal forces acting on the vanes during their rotation. This feature is quite important in machines designed to operate at high speeds. In addition, when the machine is intended to operate as a fluid motor or turbine, the machine is supplied with high pressure and high temperature fluid through the duct 26 to the hub portion of the rotor 10 and this fluid expands through the machine between its vanes 16. Accordingly, it may be desirable or necessary, particularly when the machine is so used, to provide means for cooling the vanes 16. To this end, a suitable fluid—for example, relatively cool air—may be supplied under pressure to the interior of the shaft-like extension 76 of the rotor 10. This fluid flows into the hollow interiors 106 of each vane 16 through a plurality of holes 108 adjacent its hub end, the size of said holes conforming to the relatively thin width of the vanes at their hub ends. The periphery of the rotor 10 is provided with holes 110 communicating with the interior of the adjacent ends of the vanes 16 and through which the cooling fluid discharges. With the machine operating as a fluid motor or turbine, the vane cooling fluid discharging from the holes 110 may be fed into the then outlet duct 24.

With the structure so far described, in the case of compressor operation, the spaces between adjacent teeth 43 of a partition disc 42 will carry fluid from the high pressure to the low pressure end of the machine. For example, in Figure 1, with the machine operating as a compressor, the spaces between the adjacent partition disc teeth 43 will carry a small percentage of the compressed fluid from the outlet duct 26 back to the inlet duct 24; the partition disc 42 illustrated in Figure 1 rotating clockwise in the case of compressor operation. This small back flow of compressed fluid may be tapped for some auxiliary use. Thus, the walls 35 of the housing segments 34 may each be provided with a passage 113 communicating at one end with the adjacent partition disc slot 41 and at its other end with an annular manifold 114. Where, for example, the machine is used as an air compressor in a gas turbine power plant, the compressed air collected by the manifold 114 may be supplied through a conduit 115 to passages in or between the turbine blades for cooling these blades. At this point, it should be noted that the clearance between the partition discs 42 and the adjacent walls 33 and 35 of the slots 41 is quite small but, for clarity, has been greatly exaggerated in Figure 2. Also, the walls 33 and 35 of the slots 41 extend from the inlet duct 24 to the outlet duct 26 so that the leakage path through these slots is a long path of small cross section. Also, inwardly of the partition disc teeth 43, suitable labyrinth packings 112 are carried by the walls 33 and 35 to minimize leakage radially inwardly of the partition discs 42.

As described, the main rotor 10 is provided with eight vanes 16 meshing with teeth 43 of eight partition discs 42. However, it is preferable to provide an unequal number of vanes 16 and partition discs 42 in order that the segmental spaces between pairs of adjacent partition discs do not all open to the outlet duct 26 at the same time and that they do not close to the inlet duct 24 at the same time. Figure 7 is a perspective view of a rotor 116 having seven vanes 117. Although, for clarity, only one partition disc 118 has been illustrated in Figure 7, preferably six or eight such discs are provided, an even number of partition discs facilitating their assembly with the vanes as previously described. With seven vanes and six or eight partition discs, the number of vanes and number of partition discs do not have a common factor—that is, these numbers are non-factorizing. With this construction, the segmental vane spaces between pairs of adjacent partition discs are out of phase with the segmental vane spaces between every other pair of adjacent partition discs. Except as noted above and except for the direction of rotation of the main rotor, the modification of Figure 7 is otherwise similar to that of Figures 1 to 5 and/or Figure 6.

At this point, it should be noted that the modifications illustrated in Figures 1 to 5, 6 and 7 all disclose the same basic main rotor with its vanes and partition discs but Figure 6 and Figure 7 have been taken at different angles from any of Figures 1 to 5 in order to more fully disclose the basic form of the rotor vanes and the manner of their cooperation with the partition discs.

The helico-spiral spaces formed by adjacent vanes may be machined from a solid rotor blank 120 after the blank has been machined to provide the toric surface corresponding to the outer edges of the vanes 16. The rotor blank 120 is then supported in rigid bearings (not shown) by securing it to a face plate 123 of the machining apparatus schematically indicated in Figures 8–10. A cutter bar 122, also supported by rigid bearings 124, is mounted so that its axis is tangent to the toric pitch circle—that is, so that its axis is at exactly the same position relative to the rotor axis and said toric surface as the axes of the partition discs 42. The main rotor blank 120 and cutter bar 122 are suitably geared together. This gearing may be similar to the gearing between the main rotor and partition discs as illustrated in Figure 2 although, as schematically illustrated in Figures 8 and 9, more rugged gearing, such as the meshing hypoid bevel gears 126 and 127, is preferable in order to reduce manufacturing tolerances to a minimum, the gears 126 and 127 respectively being drivably connected to the rotor blank 120 and cutter bar 122. The head 128 of the cutting bar 122 is provided with a cutting tool 130 having a cutting end 132.

Conventional means have been illustrated to progressively feed the cutting tool 130 into the rotor blank 120 as the cutting head 128 and rotor blank rotate. To this end, the cutting tool shank is substantially rectangular in cross section and is provided with rack teeth 133 inclined to its path of movement and mating with corresponding rack teeth 134 on a rod 136 axially movable within the cutter bar 122. With this construction, the cutting tool 130 must be retracted into its head 128 to the position illustrated before the rotor blank 120 and cutter can be assembled to the proper position to begin a cut. By applying power, e. g. to the face plate 123, the rotor blank 120 and cutter bar 122 are rotated the predetermined relative speed ratio of 12:8 (as fixed by the hypoid bevel gearing 126, 127 identical with the intended speed ratio of the rotor 10 and partition discs 42) and at the same time the cutting tool 130 is progressively fed into the rotor blank by axially moving the rod 136. Assuming that the vanes 16 are to be solid, the cutting end 132 of the tool 130 is made to simulate a tooth 43 of a partition disc so that an entire vane space is cut as the tool 130 is fed into the rotor blank 120—that is, the cutting of a spiral vane space proceeds as the cutting tool is fed into the rotor blank to the desired depth of cut. In Figure 8, the dotted lines 138 and 140 respectively indicate the periphery and hub portions of a finished vane space in the plane of this sectional view.

Where the inter-vane spaces are parallel-sided, as illustrated in Figure 1, the tool 130 cuts only on its circumference or outer end 132, this end having a curvature similar to the outer edge of the teeth 43 on the partition discs. In addition, the cutting end 132 of the tool should be formed to clear the side walls of the vane spaces being cut and at the same time for adequate strength the tool must have substantial thickness. Figure 10 is an end view of the tool 130 illustrating its clearance with the side walls of said vane spaces. Thus, the dotted lines 142 indicate the side walls of a vane space at the outer peripihery of the rotor, and dotted lines 144 indicate the side walls of a vane space adjacent the hub of the rotor. Also, in Figure 10, the dashed line 145 indicates the plane of the cutting edge of the tool and therefore along this line the tool cutting edge has a profile similar to the profile of the outer edge of partition disc tooth 43 in its central plane.

One rotor vane space has now been cut and the cutting tool must be withdrawn before the rotor blank can be rotated the correct amount relative to the cutting bar to place these parts in position for cutting a second vane space. This relative rotation may be effected and its magnitude controlled by conventional dividing head means disposed, for example, in the operative connection, schematically indicated at 146, between the rotor blank 120 and the hypoid gear 126. It is important to notice that the entire gear cutting operation is possible only with the shafts at their designed center distance in contradistinction to cutting ordinary involute gears wherein a hob, for example, may be fed into the designed center distance.

When the vanes are to be made hollow, the hollow space within the vane, as well as the space between adjacent vanes, may be machined from a rotor blank by means of apparatus similar to that illustrated in Figures 8 and 9 except for the cutting end of the tool. Thus, a rotor blank may be machined to the condition illustrated in Figure 11 in which the side walls 150 and 152 of each vane appear as fins projecting from a rotor 154. As illustrated, the space between each pair of vane side walls 150 and 152 is parallel-sided whereby, as machined, the spaces between the vanes are wider at their root ends. Because of this increase in width of the inter-vane space toward the root of the vanes, an entire inter-vane space can not be formed by feeding a single tool into each of these spaces in a manner similar to the aforedescribed machining operation in the case of a rotor having solid vanes. This is also true of a rotor with solid vanes if the inter-vane spaces are wider at their root portions. However, approximately one half of such an inter-vane space may be formed by one cutting operation to form a wall of one vane with the remainder of the inter-vane space formed by a separate cutting operation. In Figure 11, the space between the fin-like side walls of a vane is parallel-sided and therefore may be of similar form to the inter-vane spaces in Figures 8–9. Alternatively, in Figure 11, the cutting tool may be formed, as indicated by the dotted lines 156, so that as it is fed into the rotor blank, it cuts approximately half an inter-vane space, a space between adjacent fin-like side walls of a vane and approximately half of the next inter-vane space.

After the rotor blank has been machined to the condition illustrated in Figure 11, the side walls 150 and 152 of each vane are bent or rolled together, as illustrated by the dotted lines, to at least approximate the desired vane profile. Then, the side walls of each vane are secured together—for example, by welding along the apex or tip of the vane—and the ends of each vane are closed—for example, by welding a plate thereover. Thereafter, if necessary, the vanes may be more accurately finished to the desired profile.

Figure 12:
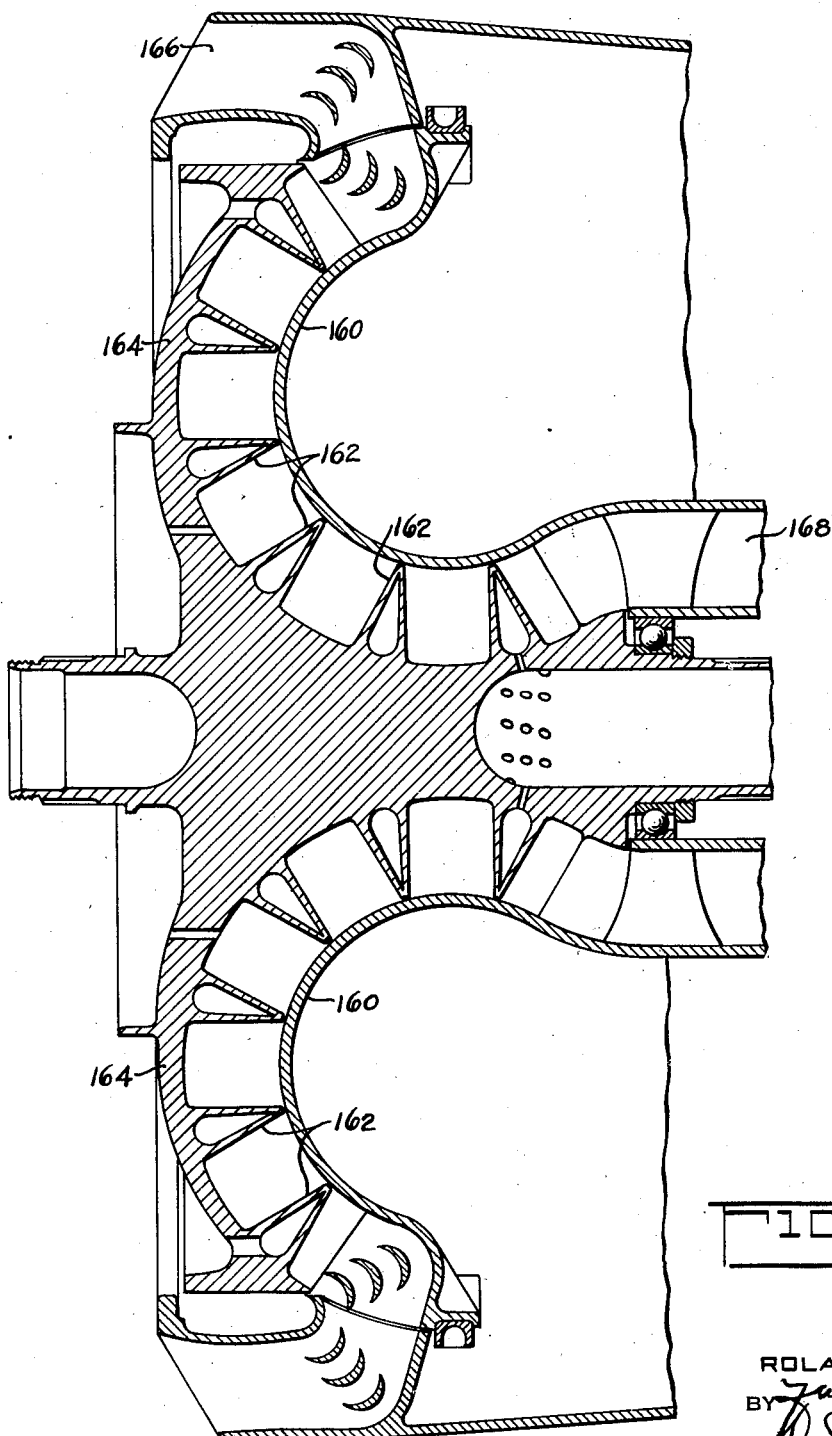
Figure 12 is a view similar to Figure 1 but of a modification employing no partition discs.

As already mentioned, a rotor, provided with spiral vanes similar to the vanes 16 of Figure 1, may be used without the partition discs 42 either as a compressor or as a radial flow turbine. Figure 12 comprises an axial section through such a machine. Accordingly, in Figure 12 the shroud or housing 160, enclosing the outer portion of the inter-vane spaces, provides a continuous wall surface over the outer edges of the vanes 162 uninterrupted by slots for partition discs. In this modification, the vanes 162 projecting from a rotor 164 preferably have a form generally similar to the helico-spiral vanes 16 described in connection with the structure of Figure 1. However, when the partition discs are not used, it is not essential that the vanes have this precise form nor is it essential that the surface from which the vanes project comprise a toric surface generated by a circular arc. If the rotor 164 is rotated at a sufficiently high speed, the spiral-like passages between the vanes will produce kinetic compression of the fluid supplied thereto through the inlet duct 166. Conversely, if gas under pressure is supplied to the duct 168, the machine will operate as a radial flow turbine.

In Figure 12, the duct 168 does not flair outwardly as does the duct 26 in Figure 1. However, this distinction depends primarily on the use to which the machine is to be put. Thus, the machine in Figure 1 was designed for use as a compressor in a gas turbine power plant, the duct supplying compressed air to the turbine combustion chamber or chambers. Incidentally, the gas turbine of this power plant may comprise a machine similar to that illustrated in Figure 1 or Figure 12.

At this point, it should be obvious that, in the case of compressor operation, the ends of the rotor vanes, adjacent the outer periphery of the rotor, point into the direction of rotation of said rotor, whereas when the machine is operating as a fluid motor, the direction of rotation of the rotor relative to its vanes reverses.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications.

I claim as my invention:

1. A device of the class described comprising a rotor having a toric surface with spaced helico-spiral vanes projecting therefrom, a plurality of spaced discs rotatable on axes tangent to the pitch circle of said toric surface, said discs having teeth forming partitions in the spaces between said vanes, and housing means extending across the tips of said vanes to enclose the spaces between said vanes, said housing means comprising a plurality of housing segments disposed in end-to-end relation to form a complete annulus, said discs being supported in pairs by alternate housing segments at opposite ends thereof, the facing ends of said housing segments providing slots through which said discs extend.

2. A device of the class described comprising first means having a toric surface with a plurality of spaced helico-spiral vanes projecting therefrom, a plurality of spaced discs rotatable on axes tangent to the pitch circle of said toric surface, said discs having teeth forming partitions in the spaces between said vanes, second means extending across the tips of said vanes to enclose the spaces between said vanes and having slots through which said discs extend, a fluid inlet continuously communicating with the inlet end of each of the inter-vane spaces, and a fluid outlet continuously communicating with the outlet end of each of the inter-vane spaces, one of said first and second means being rotatable relative to the other.

3. A device of the class described, said device comprising a rotor having a toric surface, housing means spaced from said surface and comprising therewith an open-ended annular fluid passage, vanes on said rotor dividing said passage into open-ended helico-spiral spaces, rotatable discs extending through slots in said housing means and having teeth dividing said spaces into segmental compartments spaced from the ends of said spaces, said discs being arranged radially relative to the axis of said rotor whereby said compartments decrease in circumferential length from the periphery to the hub of said rotor, a fluid inlet continuously communicating with the inlet end of each of the inter-vane spaces, and a fluid outlet continuously communicating with the outlet end of each of the inter-vane spaces.

4. A device of the class described, said device comprising a rotor having a toric surface, a plurality of circumferentially spaced vanes carried by said rotor and projecting from said surface, each of said vanes having a spiral-like configuration extending at least part way about the axis of said rotor, housing means extending across the tips of said vanes such that each pair of adjacent vanes and the facing surfaces of said rotor and housing means defines an open-ended spiral-like space, partition means extending across each of said spiral-like spaces and movable therealong, a fluid inlet continuously communicating with the inlet end of each of said spiral-like spaces, and a fluid outlet continuously communicating with the outlet end of each of said spiral-like spaces.

5. A device of the class described, said device comprising a rotor having a toric surface, a plurality of spaced vanes carried by said rotor and projecting from said surface, each of said vanes having a spiral-like configuration, housing means extending across the tips of said vanes such that each pair of adjacent vanes and the facing surfaces of said rotor and housing means defines an open-ended spiral-like space, a plurality of spaced disc-like members each rotatable about an axis spaced from and transverse to the axis of rotation of said rotor, said disc-like members extending through slots in said housing means and having teeth arranged to be received between adjacent vanes as said rotor and members rotate such that said teeth form partitions across said spiral-like spaces, a fluid inlet continuously communicating with the inlet end of each of said spiral-like spaces, and a fluid outlet continuously communicating with the outlet end of each of said spiral-like spaces.

6. A device of the class described, said device comprising a rotor having a toric surface, a plurality of spaced vanes carried by said rotor and projecting from said surface, each of said vanes having a spiral-like configuration, housing means extending across the tips of said vanes such that each pair of adjacent vanes and the facing surfaces of said rotor and housing means defines an open-ended spiral-like space, a plurality of spaced disc-like members each rotatable about an axis spaced from and transverse to the axis of rotation of said rotor, said disc-like members extending through slots in said housing means and having teeth arranged to be received between adjacent vanes as said rotor and members rotate such that said teeth form partitions across said spiral-like spaces, a fluid inlet continuously communicating with the end of said spaces adjacent the periphery of said rotor, a fluid outlet continuously communicating with the end of said spaces adjacent the hub of said rotor, and a plurality of fluid passages each having one end adapted to be successively placed into communication with the spaces between the teeth of one of said disc-like members as said teeth rotate from said outlet to said inlet.

7. A device of the class described comprising a rotor having a toric surface concentric with its axis and generated by a circular arc, a plurality of spaced vanes carried by said rotor and projecting from said surface, each of said vanes having a spiral-like configuration extending at least part way about said axis, housing means extending across the tips of said vanes such that each pair of adjacent vanes and the facing surfaces of said rotor and housing means defines an open-ended spiral-like space, a plurality of spaced disc-like members each rotatable about an axis tangent to the pitch circle of said toric surface, said disc-like members extending through slots in said housing means and having teeth arranged to be received between adjacent vanes as said rotor and members rotate such that said teeth form partitions across said spiral-like spaces, and a fluid inlet continuously communicating with the inlet end of each of said spiral-like spaces, and a fluid outlet continuously communicating with the outlet end of each of said spiral-like spaces, the thickness of said vanes progressively changing along their lengths such that in any radial plane their cross-section and the cross-section of the spaces between said vanes is constant.

8. A device of the class described comprising a rotor having a toric surface concentric with the rotor axis and generated by a circular arc, a plurality of helico-spiral vanes projecting from said rotor surface, housing means extending across the tips of said vanes such that each pair of adjacent vanes and the facing surfaces of said rotor and housing means defines an open-ended spiral-like space, a plurality of spaced disc-like members each rotatable about an axis tangent to the pitch circle of said toric surface, said disc-like members extending through slots in said housing means and having teeth arranged to be received between adjacent vanes as said rotor and members rotate such that said teeth form partitions across said spiral-like spaces, and a fluid inlet continuously communicating with the inlet end of each of said spiral-like spaces, and a fluid outlet continuously communicating with the outlet end of each of said spiral-like spaces.

9. A device of the class described comprising a rotor having a toric surface concentric with the rotor axis and generated by a circular arc, a plurality of helico-spiral vanes projecting from said rotor surfaces, housing means extending across the tips of said vanes such that each pair of adjacent vanes and the facing surfaces of said rotor and housing means defines an open-ended spiral-like space, a plurality of spaced disc-like members each rotatable about an axis tangent to the pitch circle of said toric surface, said disc-like members extending through slots in said housing means and having teeth arranged to be received between adjacent vanes as said rotor and members rotate such that said teeth form partitions across said spiral-like spaces, and a fluid inlet continuously communicating with the inlet end of each of said spiral-like spaces, and a fluid outlet continuously communicating with the outlet end of each of said spiral-like spaces, the surface of said housing means facing said toric surface being a toric surface generated by a circular arc concentric with said first-mentioned generating circular arc.

10. A device of the class described comprising a rotor; a housing, said housing and rotor having complementary toric surfaces defining therebetween an annular open-ended space which is co-axial with the axis of rotation of said rotor; a plurality of spaced vanes carried by said rotor and projecting from said rotor toric surface to said housing toric surface, each of said vanes having a spiral-like configuration extending at least part-way about said axis and extending from one end of said annular space to its other end to divide said annular space into a plurality of open-ended passages; and a fluid inlet continuously communicating with the ends of said passages at one end of said annular space; and a fluid outlet continuously communicating with all the ends of said passages at the other end of said annular space.

11. A device of the class described comprising a rotor; a housing, said rotor and housing having complementary toric surfaces defining therebetween an annular open-ended space which is co-axial with the axis of rotation of said rotor and has one end disposed at a greater distance from said axis than the other end of said space; a plurality of spaced vanes carried by said rotor, each of said vanes extending across said annular space from one end of said space to its other end; and members relative to which said rotor rotates partitioning each inter-vane space into a plurality of closed compartments which, during rotor rotation, move from one end of said annular space to its other end with the volume of each compartment varying with its distance from the rotor axis, said housing having a fluid inlet opening continuously communicating with all of the inter-vane spaces at one end of said annular space and having a fluid outlet opening continuously communicating with all of the inter-vane spaces at the other end of said annular space.

12. A device of the class described comprising a rotor; a housing, said rotor and housing having complementary toric surfaces defining therebetween an annular open-ended space which is co-axial with the axis of rotation of said rotor and has one end disposed at a greater distance from said axis than the other end of said space; a plurality of spaced vanes carried by said rotor and projecting from said rotor toric surface to said housing toric surface and extending from one end of said annular space to its other end, each of said vanes having a spiral-like configuration relative to and extending at least part-way around said rotor axis; and a plurality of disc-like members having teeth meshing with said vanes to form partitions across the inter-vane spaces; said housing having a fluid inlet opening continuously communicating with all of the inter-vane spaces at one end of said annular space and having a fluid outlet opening continuously communicating with all of the inter-vane spaces at the other end of said annular space.

13. A device as recited in claim 12 in which each of said vanes subtends an angle of less than 360° about the rotor axis and the number of said vanes and the number of said disc-like members are both at least equal to three such that each inter-vane space is partitioned by said disc-like members into at least two closed compartments spaced from the ends of said inter-vane space, each said compartment being closed at one end by a tooth of one of said disc-like members and being closed at its other end by a tooth of an adjacent one of said disc-like members and each said compartment moving from one end to the other of said annular space during rotor rotation with the volume of each compartment varying with its distance from the rotor axis.

14. A device as recited in claim 12 in which the diagonally opposite corners of the two circumferentially-spaced faces of each tooth of a disc-like member are chamfered from a plane disposed intermediate the axially spaced ends of said tooth and parallel to the plane of rotation of said member.

15. A device of the class described comprising a rotor; a housing, said rotor and housing having complementary toric surfaces defining therebetween an annular open-ended space which is co-axial with the axis of rotation of said rotor and has one end disposed adjacent to the periphery of said rotor and has its other end disposed adjacent to the hub of said rotor; a plurality of spaces vanes carried by said rotor and projecting from said rotor toric surface to said housing toric surface and extending from one end of said annular space to its other end, each of said vanes having a spiral-like configuration relative to and extending at least part-way around said rotor axis; and a plurality of disc-like members having teeth meshing with said vanes to form fluid pressure compartments between said vanes and the teeth of said disc-like members which decrease in circumferential length from the periphery to the hub of said rotor, said housing having a fluid inlet opening continuously communicating with all of the inter-vane spaces at one end of said annular space and having a fluid outlet opening continuously communicating with all of the inter-vane spaces at the other end of said annular space.

16. The combination of a rotor having a toric surface; a plurality of helico-spiral spaced vanes carried by said rotor and projecting from said surface; and a rotatable toothed disc-like member disposed for rotation about an axis tangent to the pitch circle of said toric surface, the teeth of said disc-like member being arranged for meshing engagement with said vanes and the diagonally opposite corners of the two circumferentially-spaced faces of each tooth being chamfered from a plane disposed intermediate the axially spaced ends of said tooth and parallel to the plane of rotation of said member.

ROLAND CHILTON.

REFERENCES CITED

The following references are of record in the file of this patent:

UNITED STATES PATENTS

| Number | Name | Date |
|---|---|---|
| 1,088,836 | Nielsen | Mar. 3, 1914 |
| 1,304,497 | Maxam | May 20, 1919 |
| 1,367,801 | Clark | Feb. 8, 1921 |
| 1,470,506 | Steenstrup | Oct. 9, 1923 |
| 1,989,552 | Good | Jan. 29, 1935 |
| 2,116,181 | Bauer | May 3, 1938 |
| 2,158,933 | Good | May 16, 1939 |
| 2,336,225 | Coleman | Dec. 7, 1943 |
| 2,339,966 | Ungar | Jan. 25, 1944 |
| 2,397,139 | Heaton | Mar. 26, 1946 |
| 2,411,707 | Biermann | Nov. 26, 1946 |

FOREIGN PATENTS

| Number | Country | Date |
|---|---|---|
| 28,513 | Great Britain | of 1906 |